April 30, 1957 H. MALBON ET AL 2,790,966

MAGNETIC RECORDING AND REPRODUCING DEVICE

Filed Feb. 14, 1952 4 Sheets-Sheet 1

H. MALBON & G. W. FOX
INVENTORS

BY Moore & Hall

ATTORNEYS

MAGNETIC RECORDING AND REPRODUCING DEVICE

Filed Feb. 14, 1952

H. MALBON &
G. W. FOX
INVENTORS

BY Morse & Hall

ATTORNEYS

April 30, 1957 H. MALBON ET AL 2,790,966

MAGNETIC RECORDING AND REPRODUCING DEVICE

Filed Feb. 14, 1952 4 Sheets-Sheet 3

H. MALBON &
G. W. FOX
INVENTORS

BY Moore & Hall
ATTORNEYS

April 30, 1957 H. MALBON ET AL 2,790,966

MAGNETIC RECORDING AND REPRODUCING DEVICE

Filed Feb. 14, 1952 4 Sheets-Sheet 4

INVENTORS
H. MALBON &
G. W. FOX
BY Morris & Hall
ATTORNEY 2,790,966

MAGNETIC RECORDING AND REPRODUCING DEVICE

Harry Malbon and George Warwick Fox, Hollinwood, England, assignors to National Research Development Corporation, London, England, a corporation of Great Britain Application February 14, 1952, Serial No. 271,496

Claims priority, application Great Britain February 23, 1951

15 Claims. (Cl. 340—174)

This invention relates to magnetic recording and reproducing devices and is more particularly concerned with arrangements by which electrical signals, such as electrical pulse signals employed in a digital computing machine, may be recorded as variations of magnetisation along the length of a track in a magnetic recording medium such as a nickel layer upon the outer peripheral surface of a rotating drum or wheel of the general type described in copending patent application No. 196,776 filed November 21, 1950, now Patent No. 2,694,192, granted November 9, 1954, and in the paper by F. C. Williams and J. C. West, published in the Proceedings of the Institution of Electrical Engineers, London, vol. 98, part I, No. 61, February 1951, pp. 29–34.

Copending patent application No. 195,042 filed November 10, 1950, now Patent No. 2,700,588, granted January 25, 1955, describes a multiple element recording and reproducing head suitable for use with a rotating magnetic wheel or drum whereby the facility is provided for storing a large number of pulse signals, e. g. binary digit-representing signals, along each of a large number of parallel circumferential tracks around the periphery of such drum.

In such multiple head construction a considerable number of individual head elements, each for cooperation with a different one of the circumferential recording tracks around the drum, were formed as a unitary structure by a clamped assemblage of comb-shaped members of sheet ferro-magnetic material having the teeth thereof shaped to define the required recording or reproducing flux-gaps and thus providing an aligned row of spaced head elements. This structure was then mounted parallel to the axis of rotation of the drum and with the aforesaid flux-gaps closely adjacent the outer surface of the drum.

A considerable amount of difficulty has been found in the construction of such devices in view of the extremely small mechanical dimensions involved in the formation of the active parts of each recording head and the desirably minute mechanical clearance between the operative face or gap of each head element and the adjacent recording track which is moving relatively thereto. Such dimensions are in the order of only a few thousandths of an inch and the construction of a multiple head whereby the required spacing distance between each of the recording or reproducing gaps and the adjacent recording surface can be maintained has been found to be one of great difficulty.

The percentage of faulty heads, due to malformation of the flux-gap or breakdown in the associated electric winding, may be relatively high and the presence of only one faulty head in any one multiple head assembly will necessitate either the rejection of the complete head unit or the sacrifice of usability of one complete track in the magnetic recording drum of the store.

The object of the present invention is to provide an improved construction of magnetic recording and/or reproducing head particularly for use with such multiple track devices as described in which many of the previous difficulties are either materially reduced or even avoided.

In accordance with one feature of the present invention each recording and/or reproducing head, where more than one is used in association with a multiple track recording medium, is made as a physically independent unit and is slidably mounted in a stationary carrier in such a manner that it is capable of movement towards and away from the immediately adjacent recording surface and is resiliently urged towards such surface to an extent which is positively controlled by an adjustable position abutment. Such an arrangement, in addition to providing the facility for effecting individual adjustment of the clearance between each head and its associated recording surface where a plurality of tracks are employed, also provides a safety device in that accidental contact between the head and the recording surface can be tolerated without appreciable damage to the surface by the allowable retraction of the head against the resilient urging means.

Another aspect of the invention relates to the manner of constructing an individual head of small size and by which the magnetic path-providing elements in the form of small pieces of suitable magnetic material such as "Radiometal" are almost completely surrounded and embedded within a narrow slot-shaped receiving aperture in a solid body of non-magnetic material with the gap-forming region between the adjacent magnetic members filled with a suitable filler material such as a thermosetting resin which, after setting to a solid state, e. g. by polymerisation, allows the subsequent grinding away of parts of both carrier and magnetic elements until the magnetic flux gap is of the required minute dimension.

The above and other features of the invention will be better understood from the accompanying description of one embodiment which will now be given in conjunction with the accompanying drawings in which:

Fig. 11 is a fragmentary horizontal sectional view showing the manner of mounting such a head, while

Figure 1:
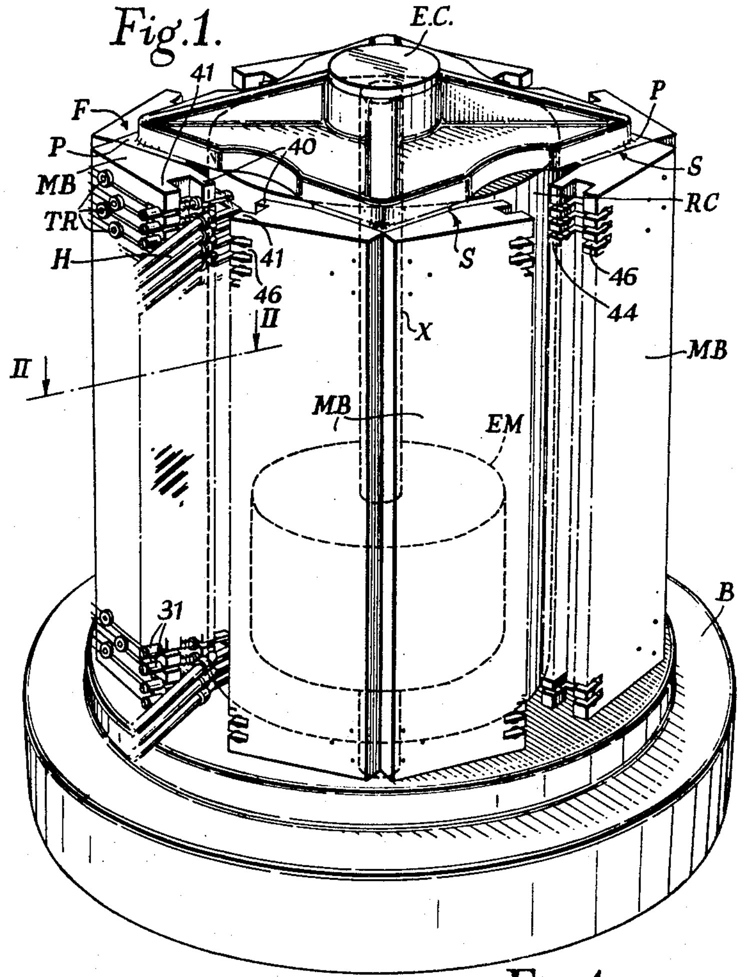
Fig. 1 is a perspective elevational view of a magnetic storage device for an electronic digital computing machine and embodying the present invention.
Figure 3:
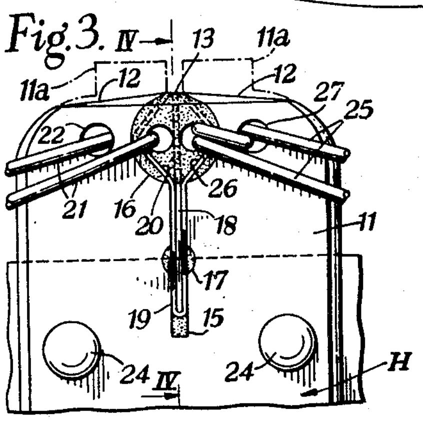
Fig. 3 is a fragmentary side elevation drawn to a much enlarged scale of recording/reproducing head.
Figure 4:
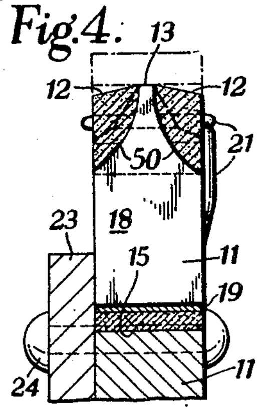
Fig. 4 is a sectional view taken on the line IV—IV of Fig. 3.
Figures 2, 5, 6, 7:
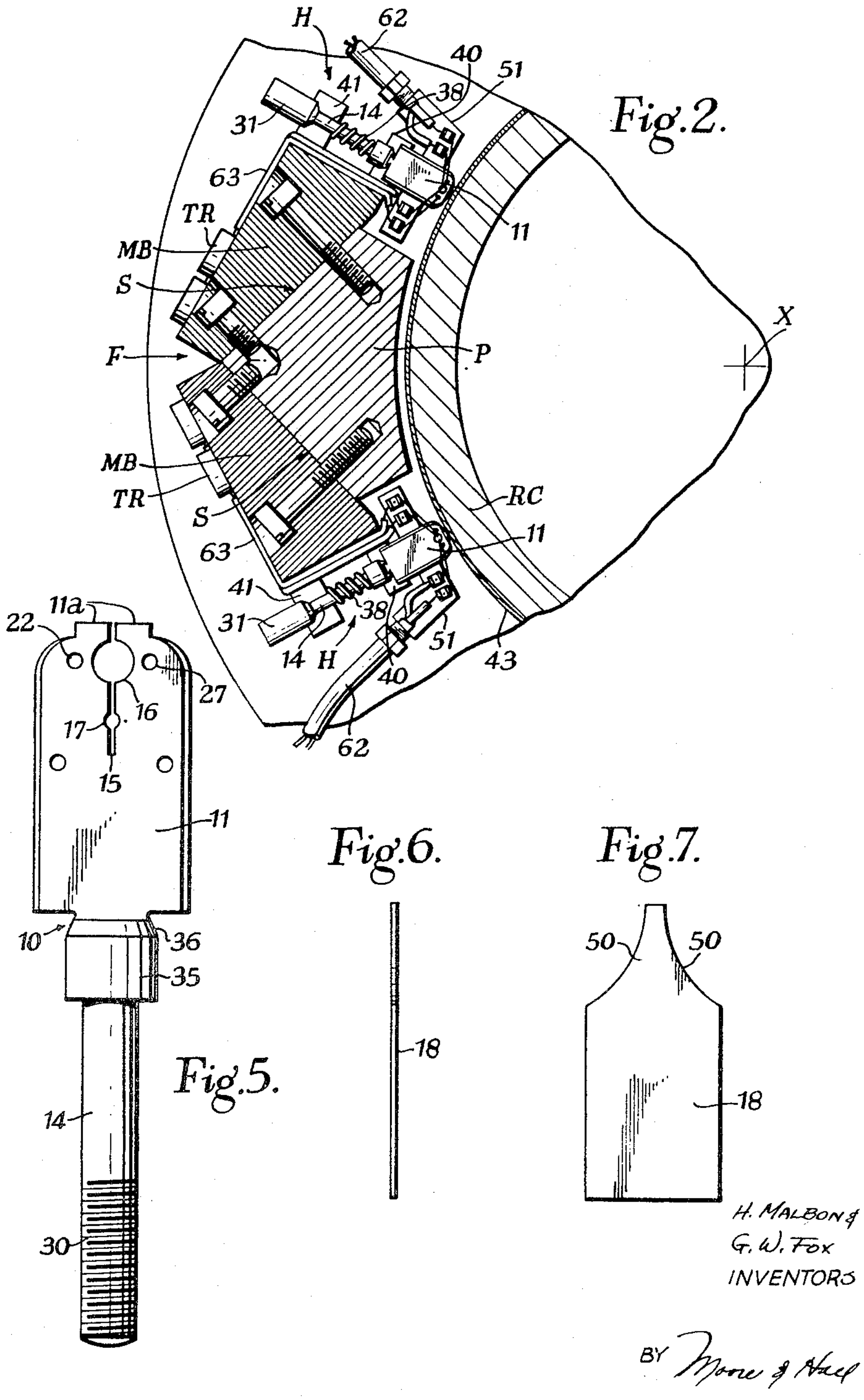
Fig. 2 is an enlarged fragmentary horizontal section taken on the line II—II of Fig. 1.
Fig. 5 is a side elevational view of the main non-magnetic body of the head without the inserted ferro-magnetic pole forming elements.
Figs. 6 and 7 are much enlarged side and end elevational views respectively of the inner pole forming element of a magnetic head.

Referring first to Figs. 1, 2 and 3, the magnetic store for an electronic digital computing machine with which the particular embodiment of the invention about to be described is adapted to cooperate, comprises a cylindrical drum RC having an outer surface layer 43 of magnetic recording material, conveniently electro-deposited pure nickel, and rotatable about a vertical axis by means of an internal electric driving motor indicated in dotted lines at EM. The drum is supported for rotation upon a fixed spindle X within a rigid stationary framework indicated generally at F and consisting of a massive baseplate B to which are secured the lower ends of four vertical corner pillars P equi-spaced around the axis of the drum RC. To the upper ends of these pillars is secured an end cap EC.

The outer surfaces S of each of the pillars P are accurately machined to be parallel to the axis of the drum RC and each provide a mounting surface for a mounting block MB which, in turn, serves to support a group of, say, 32 individual recording/reproducing heads H cooperating with the outer recording surface of the drum RC. The detailed construction of the individual heads and their manner of mounting within the various blocks MB will be described in detail later.

As the physical dimensions of each head H and its associated mounting arrangements, measured in the direction of the axis of the drum RC, are normally very much greater than the axial dimension and spacing distance between adjacent available track regions on the surface of the drum, it is usually impossible to accommodate a separate head for each track in one group on one mounting block MB and instead the requisite heads are accommodated in eight groups, each on separate mounting blocks secured to different faces S of the pillars P. The available spacing distance between adjacent heads in any one group is thereby extended to a distance equal to that required by eight succesive tracks upon the drum RC whereby the heads of the first group cooperate with tracks numbered 0, 8, 16, 24 . . . 248, those of the next group with tracks numbered 1, 9, 17 . . . 249 and so on. The various mounting blocks MB are similar in shape apart from the requisite slight staggering of the head receiving means thereof in the direction of the axis of the drum to achieve the above described selective cooperation with different groups of the available recording tracks.

The mounting blocks MB also support a series of step-down or writing head transformers TR, one for each of the recording head sections of each head H whereby losses due to the very low input impedance of such recording heads are reduced as far as possible by reduction of the length of the interconnecting leads between the winding of the head and the output terminals of the transformer.

Referring now more particularly to Figs. 3–12 of the drawings, each single recording/reproducing head H comprises a carrier body 10 of brass or other suitable non-magnetic material having a thin rectangular-section solid end part 11 whose foremost marginal edge is bevelled off at each side as indicated at 12 to define a small operative face area 13. From the rear edge of the end portion 11 extends an axially directed circular-section stem 14.

The end part 11 is slotted transversely at 15 in a plane which includes the axis of the stem 14 and such slot 15 is enlarged, near to its outer end by a circular section hole 16. A second smaller hole 17 forms a second enlargement of the slot nearer to its opposite, closed end.

The slot 15 and its enlarging hole 16 serve to accommodate the magnetic-flux path or pole forming elements which are shown separately in Figs. 6–9. One of these elements is formed by a narrow central strip 18 of thin (e. g. .004 inch) "Radiometal" or like alloy while the other element is constituted by an outer strip 19 of similar material folded at its mid point so as to lie around the lower end of the strip 18 and closely embrace each side surface of the latter up to the point where the elements enter the hole 16 of the body 10. "Radiometal" is a magnetic alloy of the Permalloy type containing iron 50%, nickel 45% and copper 5%. At this point each side limb of the strip 19 is first bent sharply outwards away from the strip 18 and then inwards again so as to converge upon the central strip 18 at a point coincident with the plane of the face area 13. At their extremities the tips of these strips 18, 19 are chamfered at 50 so as to reduce their width and hence the eventual transverse width of the magnetic flux-gap formed therebetween.

The triangular aperture 20 left between the central strip 18 and one side limb of the outer strip 19 receives a single turn energising winding 21 one end of which is also passed through a hole 22 in the end part 11. The ends of this winding, which serves as the write energising winding for effecting recording, are soldered to connecting tags 60 mounted upon an insulated terminal strip 23 secured by screws or rivets 24 to the end part 11. A second similar winding 25, which serves as the pick-up winding of the read head for effecting reproduction and consisting of two turns, is threaded through the other triangular aperture 26 and hole 27 and has its ends soldered to further connecting tags 61 on the terminal strip 23. The latter is conveniently formed with an extension 51 serving to anchor the end of a connecting cable 62 for conveying the read head output to other parts of the machine. Connections 63 from the terminal tags 60 to the associated step down input transformer TR (Fig. 1) extend through an inward extension slot 64 as shown in Fig. 11.

Figure 8:
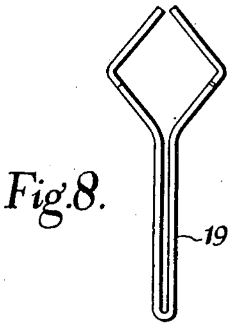
Figs. 8 and 9 are views, similar to Figs. 6 and 7, of the corresponding outer pole forming element of the head.
Figure 9:
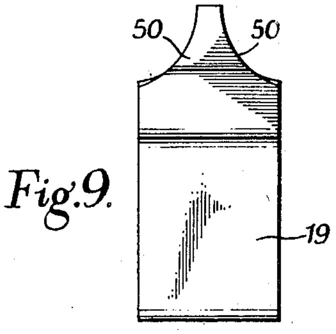
Figure 10:
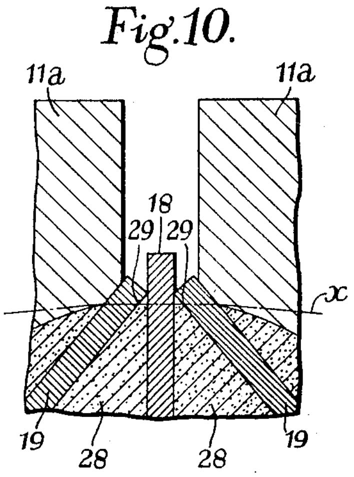
Fig. 10 is a further enlarged fragmentary view illustrating the manner of initial construction of the gap-forming elements and the subsequent grinding to the required form.

The converging tips of the outer strip 19 are required to terminate close to but not touching the central strip 18 so as to define narrow gaps each of the order of .0005 inch width across which the varying magnetic flux strengths characterising the signals being recorded or reproduced are developed. In order to achieve this gap formation the strips 18, 19 are initially formed slightly longer than their final dimension and, after bending of the outer strip in the manner described and as shown more particularly in Figs. 8 and 9, are both forcibly inserted into the slot 15 with the bent regions of the outer strip accommodated in the hole 16. The spaces in the hole 16 around the converging tips of the strips 18, 19, which at this time are in firm contact with one another, are filled with small amounts 28 of a suitable thermo-setting synthetic resinous material such as "Araldite," which is a thermo-setting epoxy resin. This material is then polymerised by appropriate heat treatment after which end projections **11*a* initially provided on the end part 11 and the tips of the strips 18, 19** are ground away to a depth such as that indicated by the line *x*, Fig. 10 at which the flux-gaps 29 between the central strip 18 and the side strips 19 are of the required dimension. The windings 21, 25 are threaded subsequently, if necessary, after passing a drill through the apertures 20, 26 to clear any superfluous resin material.

Figure 11:
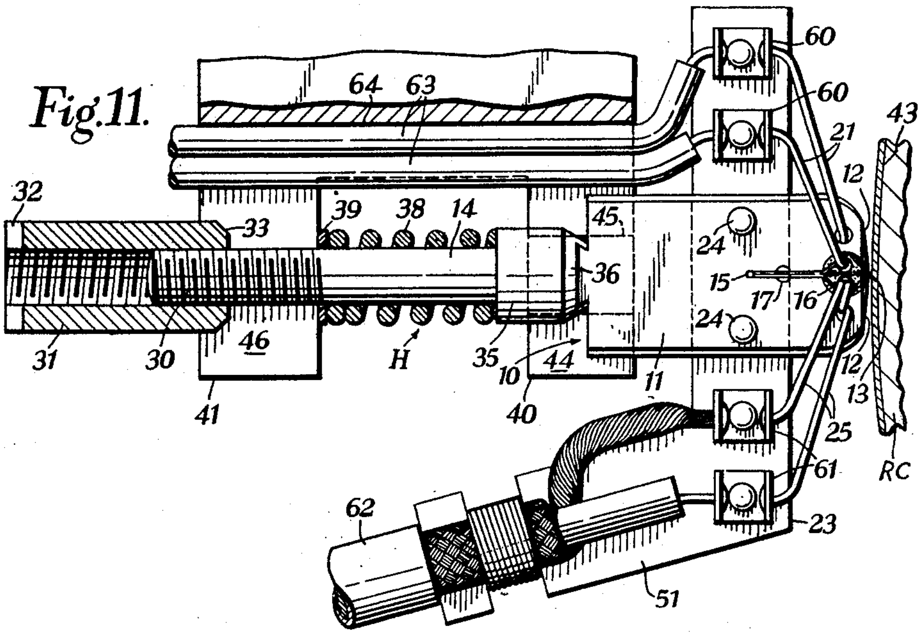
Figure 12:
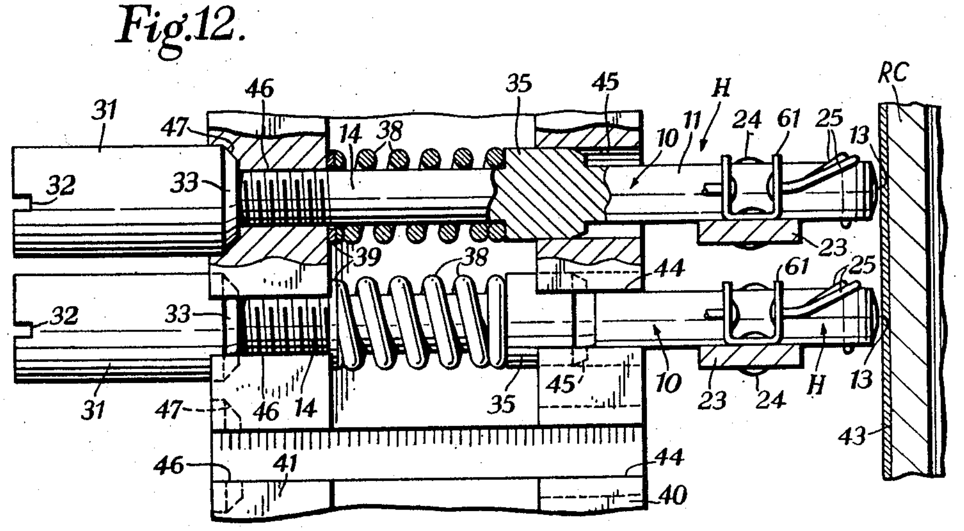
Fig. 12 is a side elevation, partly in section of the mounting arrangements for several heads as shown in Fig. 4.

The manner of mounting each head is illustrated in Figs. 11 and 12. The free end of the stem 14 of each head is screw-threaded as at 30 and receives thereon a threaded sleeve 31 provided with a screw-driver slot 32 at one, its outer end, and with a conical end face 33 at its other end. The junction region between the stem 14 and the end part 11 is formed with a circular cross-section collar 35 having a chamfered forward end 36 for the reception of a special insertion tool as described later. Between the collar 35 and the sleeve 31, the stem 14 is surrounded by a helical compression spring 38 and a thrust washer 39.

The various heads of a group are carried in aligned slots formed in two separated but parallel ribs 40, 41 projecting from the main body portion of the associated mounting bar MB which, as already described in connection with Figs. 1 and 2, is rigidly secured to a pillar P of the main framework F within which the rotating drum RC is mounted. The inner or drum end of each head is disposed in a slot 44 of a width which snugly accommodates the thickness dimension of the end part 11. Near to its inner end, this slot 44 is provided on the outer face of the rib 40, with a bore 45 which snugly receives the collar 35. At its outer end the threaded stem 14 is carried in a slot 46 which, near to its inner end, is provided with a conical depression 47 in the outer face of the rib 41 in alignment with the bore 45.

Figure 13:
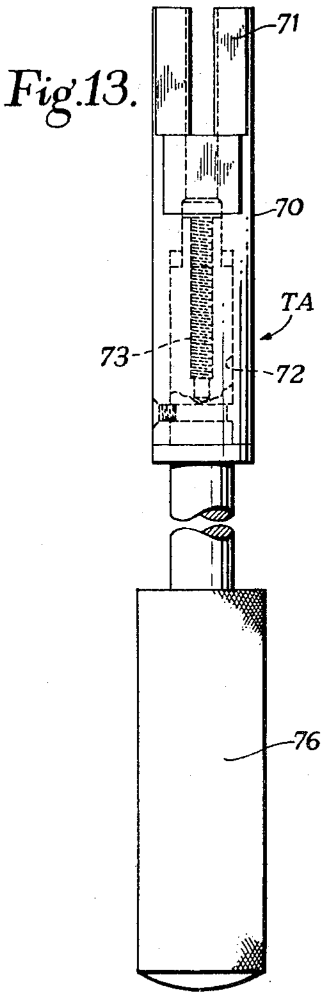
Figs. 13 and 14 are elevational views of tools usable for inserting and withdrawing a head into or from its operative location adjacent the magnetic recording drum.
Figure 14:
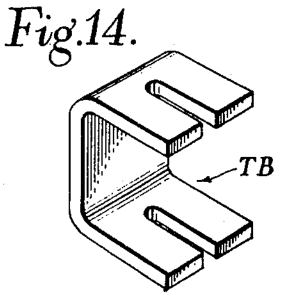

To insert a head H, the spring 38 is compressed with a first tool TA as shown in Fig. 13, consisting of an outer sleeve 70 having a bifurcated end 71 thin enough to pass into the slot 46 and an inner telescopic member 72 which is axially bored and threaded at 73 to receive the outer end of the stem 14. This inner member 72 which is integral with a handle 76 is screwed upon the stem in place of the sleeve 31 and the spring 38 compressed between the tips of the bifurcated end 71 of the outer tool sleeve 70 and the collar 35 to an extent sufficient to allow the spring 38 and the collar 35 to be passed into the gap between the ribs 40, 41. With the spring 38 thus compressed, the head H is passed into the slots 44 and 46 and a second tool in the form of a slotted U-shaped spacing element TB as shown in Fig. 14 is placed on the end part 11 between the end surface 36 of the collar 35 and the outer surface of the rib 40. The first tool TA is then removed and replaced by the sleeve 31. The U-shaped element TB is then removed whereby the parts assume the positions shown in Figs. 11 and 12 in which the spring 38 acts to urge the washer 39 into contact with the forward face of the rib 41 and thereby to urge the complete head resiliently forwards towards the surface 43 of the drum RC whereby the collar 35 enters the bore 45. The sleeve 31 is then adjusted to draw the head backwards away from the drum surface to the required clearance dimension. When thus positioned each head is disposed so as to lie radial with respect to the drum surface in an accurately defined position set by the location of the collar 35 in bore 45 and conical end face 33 in depression 47, the flux-gaps 29 in the end face 13 of the head H being held at right-angles to the circumferential direction of the recording track on the drum by the location of the end part 11 in the snug-fitting slot 44.

As may be seen from Fig. 12, the ribs 40, 41 are provided with a plurality of, e. g. 32, aligned pairs of slots 44, 46 for mounting the required number of heads in side-by-side relationship. As already explained the permissible spacing between adjacent tracks on the recording drum is normally much closer than is permitted by the necessary physical size of the heads, so that as shown in Figs. 1 and 3 a number of mounting bars MB may be provided at spaced intervals around the rotating drum, the various slots 44, 46 of the ribs 40, 41 thereof being in suitably staggered relationship, relative to the circumferential direction of the tracks, to those of the other mounting bars so as collectively to deal with all the tracks on the drum.

We claim:

1. A magnetic recording and reproducing device for electric signals comprising a movable recording medium having a width, transverse to the direction of movement thereof which is capable of accommodating a plurality of parallel recording tracks, a physically separate magnetic recording and/or reproducing head for each of a number of said tracks each of said heads being held in stationary but adjustable position relative to said movable recording medium and each head comprising magnetic gap-forming elements, at least one electro-magnetic winding associated with said gap-forming elements and a non-magnetic carrier body of flattened cross-section supporting said gap-forming elements and said electro-magnetic winding, stationary mounting means extending transversely across the width of said recording medium, said mounting means having a plurality of slots therein each receiving the carrier body of one of said heads for sliding movement towards and away from said recording surface along a path disposed normal to said surface, resilient means urging each of said carrier bodies towards said recording surface and adjustable abutment means on each of said carrier bodies for limiting the extent of said resilient movement towards said recording surface.

2. A magnetic recording and reproducing device for electric signals comprising an endless movable recording surface having a width, transverse to the direction of movement thereof which is capable of accommodating a plurality of parallel but separated recording tracks, a physically separate and readily removable magnetic recording and/or reproducing head for each of a plurality of said tracks, each of said heads being held in stationary but adjustable position relative to said movable recording surface and each head comprising a pair of magnetic gap-forming elements, at least one electro-magnetic winding associated with said gap forming elements, a non-magnetic carrier body of flattened cross-section supporting said gap-forming elements and said electro-magnetic winding, stationary mounting means extending transversely across the width of said recording medium, said mounting means having a plurality of slots therein each for receiving the carrier body of a different one of said heads for sliding movement towards and away from said recording surface in a direction lying normal to said surface lying opposite said magnetic gap, spring means trapped between said mounting means and each of said carrier bodies for independently urging each carrier body towards said recording surface and separate adjustable abutment means on each of said carrier bodies and engaging said mounting means for limiting the extent of said resilient movement towards said recording surface.

3. A magnetic recording and reproducing device for electric signals comprising a rotatable non-magnetic drum having a magnetic recording medium upon its outer circumferential surface, said surface having an axial length such as is capable of accommodating a plurality of parallel circumferential recording tracks thereon, a physically separate magnetic recording head for each of a plurality of said tracks, each head comprising a pair of magnetic recording gap-forming elements, an electric winding interlinking said gap-forming elements, a carrier body of flattened cross-section supporting said gap-forming elements and said electric winding and a screw-threaded extension on said carrier body, slide mounting means comprising a slotted member for mounting each of said carrier bodies for movement in a radial direction towards and away from said recording surface of said drum, resilient spring means surrounding the extension of each of said heads for continuously urging said carrier body towards said recording surface and adjustable abutment means on each of said extensions for limiting the extent of such resilient movement towards said recording surface of said drum.

4. A magnetic recording and/or reproducing head for a magnetic recording and reproducing device for electric signals which comprises a unitary non-magnetic body member consisting of a head portion of flattened cross-section and a stem projecting axially from one end of said head portion, a narrow slot in said head portion extending from the end thereof opposite to said stem towards said stem, at least two ferromagnetic gap-forming elements disposed in said slot, said gap-forming elements being shaped adjacent the outer end of said slot to define two mutually convergent pole tips and an aperture between said elements for receiving an electric winding, a body of hardened electrical insulating material filling the interstices of said aperture and between the slot in said head portion and said ferromagnetic gap-forming elements in the vicinity of the outer end of said slot, an electric wire receiving hole through said insulating material within said winding receiving aperture between said magnetic members and an electric winding passing through said hole.

5. A magnetic recording and reproducing head for a magnetic recording and reproducing device for electric signals which comprises a non-magnetic body member consisting of a head portion of flattened cross-section and an integral stem projecting axially from said head portion, a narrow axially directed slot in said head portion disposed transversely to said flattened section and extending from the outermost end thereof opposite to said stem towards said stem, a plurality of ferromagnetic tongue-like magnetic gap-forming elements disposed in said slot, said gap-forming elements being shaped adjacent the outer end of said slot to define two pairs of mutually convergent pole tips and an aperture between each pair of pole tips for receiving an electric winding, a body of hardened electrical insulating material filling the interstices between the slot in said head portion and the inserted ferromagnetic gap-forming elements and cementing such elements in position in said slot, electric wire receiving holes through said insulating material within each of said winding receiving apertures between said magnetic members and separate electric windings passing through each of said holes.

6. A magnetic recording and reproducing head for a magnetic type storage device in an electronic digital computing machine which comprises a body member of non-magnetic metal and consisting of a head portion of flattened rectangular cross-section and a circular cross-section stem projecting axially from one end of said head portion, a narrow axially directed slot in said head portion extending from the end thereof opposite to said stem, an enlargement of said slot immediately adjacent the outer end thereof, two ferromagnetic sheet metal gap-forming elements disposed in said slot, said gap forming elements being shaped at the region thereof lying in said enlargement of said slot to define two pairs of mutually convergent pole tips, a mass of hardened electrical insulating material filling the interstices between the walls of the said enlargement of said slot and the ferromagnetic elements and between said elements in the vicinity of the magnetic gap-forming end of the latter, electric wire receiving apertures through said insulating material and between said ferromagnetic members within said enlargement and an electric winding passing through each of said apertures.

7. A magnetic head structure for a magnetic recording and reproducing device for electric signals which comprises a body member of non-magnetic material and consisting of a head portion of flattened cross-section and a screw-threaded stem projecting axially from one end of said head portion, an axially directed narrow slot in said head portion extending from the end thereof opposite to said stem towards said stem, an enlargement in said slot in close proximity to the outer end thereof, two ferromagnetic gap-forming elements of thin strip metal wedged in said slot in face to face abutting relationship, said gap forming elements being shaped towards their outermost ends to define mutually convergent pole tips in the region of said enlargement and lying in the plane of said end of said head portion, a body of hardened cementing material filling the interstices between the slot in said head portion and the magnetic gap-forming elements in said enlargement, an electric wire receiving aperture through said cementing material between the convergent pole tip portions of said gap-forming elements and an electric winding passing through said aperture.

8. A magnetic recording and reproducing device for electric signals having a recording medium providing a plurality of parallel and separate recording tracks thereon wherein each recording and reproducing head for each track is constituted by a physically independent structure, each of said head structures comprising a non-magnetic body member consisting of a head portion of flattened cross-section and a stem projecting axially from said head portion, a narrow slot in said head portion extending from the end thereof opposite to said stem towards said stem, at least two ferromagnetic gap-forming elements disposed in said slot, said gap-forming elements being shaped adjacent the outer end of said slot to define two mutually convergent pole tips and an aperture between said elements for receiving an electric winding and a body of hardened electrical insulating material filling the interstices of said aperture and between the slot in said head portion and said ferromagnetic gap-forming elements in the vicinity of the outer end of said slot and an electric winding passing through holes in said insulating material within said winding receiving aperture between said magnetic members, at least one stationary mounting bar disposed parallel to but spaced from said recording medium, said mounting bar comprising a plurality of slots each opposite a different one of said recording tracks, each of said slots being of a width to receive the narrower dimension of the flattened cross-section of the head portion of a head structure in a slidable but non-rotatable manner therein, spring means for each head structure operating to urge said structure slidably towards said recording medium and an adjustable position abutment on said stem of each of said head structures for engagement with said mounting bar to limit the extent of said resilient sliding movement at the required spacing dimension between said pole tips and said recording medium.

9. A magnetic recording and reproducing device for electric signals having a movable recording medium of a width, transverse to its direction of movement, sufficient to provide a plurality of parallel and separate recording tracks thereon wherein a separate and physically independent recording and reproducing head is provided for each track and is constituted by a unitary structure, each of said head structures comprising a non-magnetic body member consisting of a head portion of flattened cross-section and a stem projecting axially from said head portion, a narrow slot in said head portion extending from the end thereof opposite to said stem towards said stem, at least two ferromagnetic gap-forming elements disposed in said slot, said gap-forming elements being shaped adjacent the outer end of said slot to define two mutually convergent pole tips and an aperture between said elements for receiving an electric winding and a body of hardened electrical insulating material filling the interstices of said aperture and between the slot in said head portion and said ferromagnetic gap-forming elements in the vicinity of the outer end of said slot and an electric winding passing through holes in said insulating material within said winding receiving aperture between said magnetic members, at least one stationary mounting bar disposed parallel to but spaced from said recording medium, said mounting bar comprising a plurality of slots each opposite a different one of said recording tracks, each of said slots being of a width to receive the narrower dimension of the flattened cross-section of the head portion of a head structure in a slidable but non-rotatable manner therein, spring means for each head structure operating to urge said structure slidably towards said recording medium and an adjustable position abutment on said stem of each of said head structures for engagement with said mounting bar to limit the extent of said resilient sliding movement at the required spacing dimension between said pole tips and said recording medium.

10. A magnetic recording and reproducing device for electric signals having a rotatable recording drum whose outer cylindrical surface provides a plurality of parallel and axially separated circumferential recording tracks therearound wherein a separate and physically independent recording and reproducing head is provided for each track, each of said head structures comprising a non-magnetic body member consisting of a head portion of flattened cross-section and a stem projecting axially from said head portion, a narrow slot in said head portion extending from the end thereof opposite to said stem towards said stem, at least two ferromagnetic gap-forming elements disposed in said slot, said gap-forming elements being shaped adjacent the outer end of said slot to define two mutually convergent pole tips and an aperture between said elements for receiving an electric winding and a body of hardened electrical insulating material filling the interstices of said aperture and between the slot in said head portion and said ferromagnetic gap-forming elements in the vicinity of the outer end of said slot and an electric winding passing through holes in said insulating material within said winding receiving aperture between said magnetic members, at least one stationary mounting bar disposed parallel to but spaced from said recording medium, said mounting bar comprising a plurality of slots each opposite a different one of said recording tracks, each of said slots being of a width to receive the narrower dimension of the flattened cross-section of the head portion of a head structure in a slidable but non-rotatable manner therein, spring means for each head structure operating to urge said structure slidably towards said recording medium and an adjustable position abutment on said stem of each of said head structures for engagement with said mounting bar to limit the extent of said resilient sliding movement at the required spacing dimension between said pole tips and said recording drum.

11. A magnetic signal-storage device comprising a movable magnetic recording medium having a width, transverse to the direction of movement thereof which is capable of accommodating a plurality of parallel recording tracks, a physically separate magnetic transducer head for each of a number of said tracks, each of said heads comprising a non-magnetic carrier body of flattened rectangular cross-section, said carrier body having a slot therein extending inwardly from an end surface thereof in a plane parallel with its lesser cross-sectional dimension, magnetic gap-forming elements of thin strip ferromagnetic material embedded in said slot, at least one electromagnetic winding associated with said gap-forming elements, a mass of hardened electrical insulating material filling the interstices between said slot, said gap-forming elements and said winding, said gap-forming elements defining a magnetic flux gap in said end surface of said flattened body which is disposed at right angles to the larger dimension of the cross-section of said body, a stationary mounting rack of elongated form secured adjacent said movable recording medium, said mounting rack having a plurality of transverse slots therein each for receiving the lesser dimension of said flattened cross-section carrier body of said head, said slots being each opposite a different one of said recording tracks, spring means operative between said mounting rack and each of said carrier bodies of said head for resiliently urging each head independently towards said recording medium and separate adjustable abutment means on each of said carrier bodies engaging said mounting rack for limiting the extent of said resilient movement towards said recording surface.

12. A magnetic signal-storage device comprising a rotatable magnetic recording drum having an axial length which is capable of accommodating a plurality of parallel recording tracks, a physically separate magnetic transducer head for each of a number of said tracks, each of said heads comprising a carrier body in the form of a rectangular cross-section block of non-magnetic metal, having a slot therein extending inwardly from one end surface in a plane parallel with its lesser cross-sectional dimension, magnetic gap-forming elements of thin strip ferromagnetic metal embedded in said slot, said gap-forming elements being shaped to define a magnetic flux gap in said end surface of said block, at least one electromagnetic winding associated with said gap-forming elements, a mass of hardened electrical insulating material filling the interstices between said slot, said gap-forming elements and said winding, a stationary mounting rack of elongated form secured adjacent to but spaced from said rotating drum, said mounting rack having a plurality of transverse slots therein each of a width suitable for receiving the lesser cross-sectional dimension of said block of said carrier body, said slots being each opposite a different one of said recording tracks, spring means operative between said mounting rack and each of said carrier bodies of said head for resiliently urging said end surface on each of said heads independently towards said recording drum and adjustable abutment means on each of said carrier bodies engaging said mounting rack for limiting the extent of said resilient movement towards said recording drum.

13. A magnetic signal-storage device comprising a movable magnetic recording medium having a width, transverse to the direction of movement thereof which is capable of accommodating a plurality of parallel recording tracks, a physically separate magnetic transducer head for each of a number of said tracks, each of said heads comprising a non-magnetic carrier body in the form of a flattened rectangular cross-section block having an axially directed screw-threaded extension rod at one end and a magnetic flux gap at the opposite end, said flux gap being disposed at right angles to the larger dimension of the cross-section of said body, a stationary mounting track of elongated form secured adjacent said movable recording medium, said mounting rack having a plurality of slots therein each for receiving the flattened cross-section carrier body of said head, said slots being each opposite a different one of said recording tracks, spring means operative between said mounting rack and each of said carrier bodies of said head for resiliently urging each head independently towards said recording medium and adjustable abutment means on said screw-threaded extension rod of each head engaging said mounting rack for limiting the extent of said resilient movement towards said recording surface.

14. A magnetic signal-storage device comprising a movable magnetic recording medium having a width, transverse to the direction of movement thereof which is capable of accommodating a plurality of parallel recording tracks, a physically separate magnetic transducer head for each of a number of said tracks, each of said heads comprising a non-magnetic carrier body in the form of a flattened rectangular cross-section block having an axially directed screw-threaded extension rod at one end and a magnetic flux gap in the exposed surface of the opposite end of said block, said flux gap being disposed at right angles to the larger dimension of the cross-section of said body, a stationary mounting rack of elongated form secured adjacent said movable recording medium, said mounting rack comprising first and second parallel ribs each having a plurality of aligned slots therein, the slots in said first rib each being of a width for receiving the flattened cross-section carrier body of one of said heads and the slots in the second rib being of a width for receiving the screw-threaded extension of one of said heads, said slots being each opposite a different one of said recording tracks, a helical spring means surrounding each threaded extension and trapped between said second rib and said carrier bodies of each of said heads for resiliently urging each head independently towards said recording medium and adjustable screwed abutment means on said threaded extension rod carrier body of each head engaging said second rib of the mounting rack for limiting the extent of said resilient movement towards said recording surface and determining the spacing between said flux-gap of such head and said recording medium.

15. A magnetic signal-storage device according to claim 14 wherein each of said transducer heads includes an enlarged cylindrical portion adjacent the junction between said block and said extension rod and wherein each slot in said first rib of said mounting rack has a cylindrical enlargement for slidably receiving said enlarged cylindrical portion.

(References on following page)

References Cited in the file of this patent

UNITED STATES PATENTS

| | | |
|---|---|---|
| 838,423 | Kitsee | Dec. 11, 1906 |
| 2,270,320 | Liguori | Jan. 20, 1942 |
| 2,424,633 | Rieber | July 29, 1947 |
| 2,431,540 | Camras | Nov. 25, 1947 |
| 2,435,242 | Somes | Feb. 3, 1948 |
| 2,530,584 | Pontius | Nov. 21, 1950 |
| 2,540,654 | Cohen | Feb. 6, 1951 |
| 2,554,582 | Mallina | May 29, 1951 |
| 2,584,984 | Camras | Feb. 12, 1952 |
| 2,591,070 | Howell | Apr. 1, 1952 |
| 2,617,705 | Coombs | Nov. 11, 1952 |
| 2,621,259 | Grantham | Dec. 9, 1952 |
| 2,708,693 | Hendrickson | May 17, 1955 |

OTHER REFERENCES

Paper by J. L. Hill, delivered at Assn. for Comp. Mach. Conference, Mar. 28, 29, 1950, pp. 1–8.